United States Patent
Jon et al.

(10) Patent No.: US 8,749,867 B2
(45) Date of Patent: Jun. 10, 2014

(54) ELECTROWETTING DISPLAY PANEL AND METHOD OF MANUFACTURING THE SAME

(75) Inventors: Chanuk Jon, Seoul (KR); Gilhwan Yeo, Hwaseong-si (KR); Jinbo Shim, Seoul (KR); Jaejin Lyu, Yongin-si (KR); Wonil Choi, Ansan-si (KR); Wangsu Hong, Asan-si (KR)

(73) Assignee: Liquavista B.V., Eindhoven (NL)

( * ) Notice: Subject to any disclaimer, the term of this patent is extended or adjusted under 35 U.S.C. 154(b) by 0 days.

(21) Appl. No.: 13/612,237

(22) Filed: Sep. 12, 2012

(65) Prior Publication Data

US 2013/0301106 A1 Nov. 14, 2013

(30) Foreign Application Priority Data

May 9, 2012 (KR) ........................ 10-2012-0049086

(51) Int. Cl.
*G02F 1/03* (2006.01)
*G02B 26/02* (2006.01)
*G09G 3/34* (2006.01)

(52) U.S. Cl.
USPC ........... 359/253; 359/245; 359/237; 359/228; 345/60; 345/84

(58) Field of Classification Search
USPC ......... 359/228, 237, 245, 252, 253, 290, 291; 345/5, 6, 38, 60, 82–84, 89, 173–175, 345/179; 427/58, 66; 204/518, 627
See application file for complete search history.

(56) References Cited

U.S. PATENT DOCUMENTS

| | | | |
|---|---|---|---|
| 6,328,408 B1 | 12/2001 | Gelbart | |
| 6,338,901 B1 | 1/2002 | Veerasamy | |
| 7,310,080 B2* | 12/2007 | Jessop | 345/89 |
| 7,561,340 B2* | 7/2009 | Tseng et al. | 359/665 |
| 7,646,458 B2 | 1/2010 | Onda | |
| 7,763,314 B2* | 7/2010 | Dai et al. | 427/164 |
| 7,872,790 B2* | 1/2011 | Steckl et al. | 359/253 |
| 8,350,783 B2* | 1/2013 | Feenstra et al. | 345/60 |
| 8,456,728 B2* | 6/2013 | Chen et al. | 359/245 |
| 2009/0068374 A1 | 3/2009 | Shin et al. | |
| 2009/0316253 A1 | 12/2009 | Fairley et al. | |
| 2010/0225611 A1 | 9/2010 | Lee et al. | |
| 2011/0007046 A1 | 1/2011 | Tsai et al. | |
| 2011/0157678 A1 | 6/2011 | Chen et al. | |
| 2012/0154886 A1* | 6/2012 | Heikenfeld et al. | 359/228 |
| 2013/0242371 A1* | 9/2013 | Kodaira | 359/290 |

FOREIGN PATENT DOCUMENTS

| | | |
|---|---|---|
| JP | 2003-344640 | 12/2003 |
| JP | 2007-033090 | 2/2007 |
| JP | 2007-093605 | 4/2007 |
| KR | 1020030092314 | 12/2003 |
| KR | 1020050043221 | 5/2005 |
| KR | 1020070045014 | 5/2007 |
| KR | 1020080001949 | 1/2008 |

(Continued)

*Primary Examiner* — Loha Ben
(74) *Attorney, Agent, or Firm* — Lee & Hayes, PLLC

(57) ABSTRACT

An electrowetting display panel includes an array substrate, a cover substrate, an electrowetting layer, and a hydrophobic pattern. The array substrate includes a display area and a peripheral area surrounding the display area and the cover substrate faces the array substrate. The electrowetting layer is disposed between the array substrate and the cover substrate and includes a polar fluid as a first fluid and a non-polar fluid as a second fluid. The hydrophobic pattern is disposed in the peripheral area.

22 Claims, 15 Drawing Sheets

(56) References Cited

FOREIGN PATENT DOCUMENTS

| KR | 1020100114238 | 10/2010 |
| KR | 1020110063052 | 6/2011 |
| KR | 1020110112598 | 10/2011 |

* cited by examiner

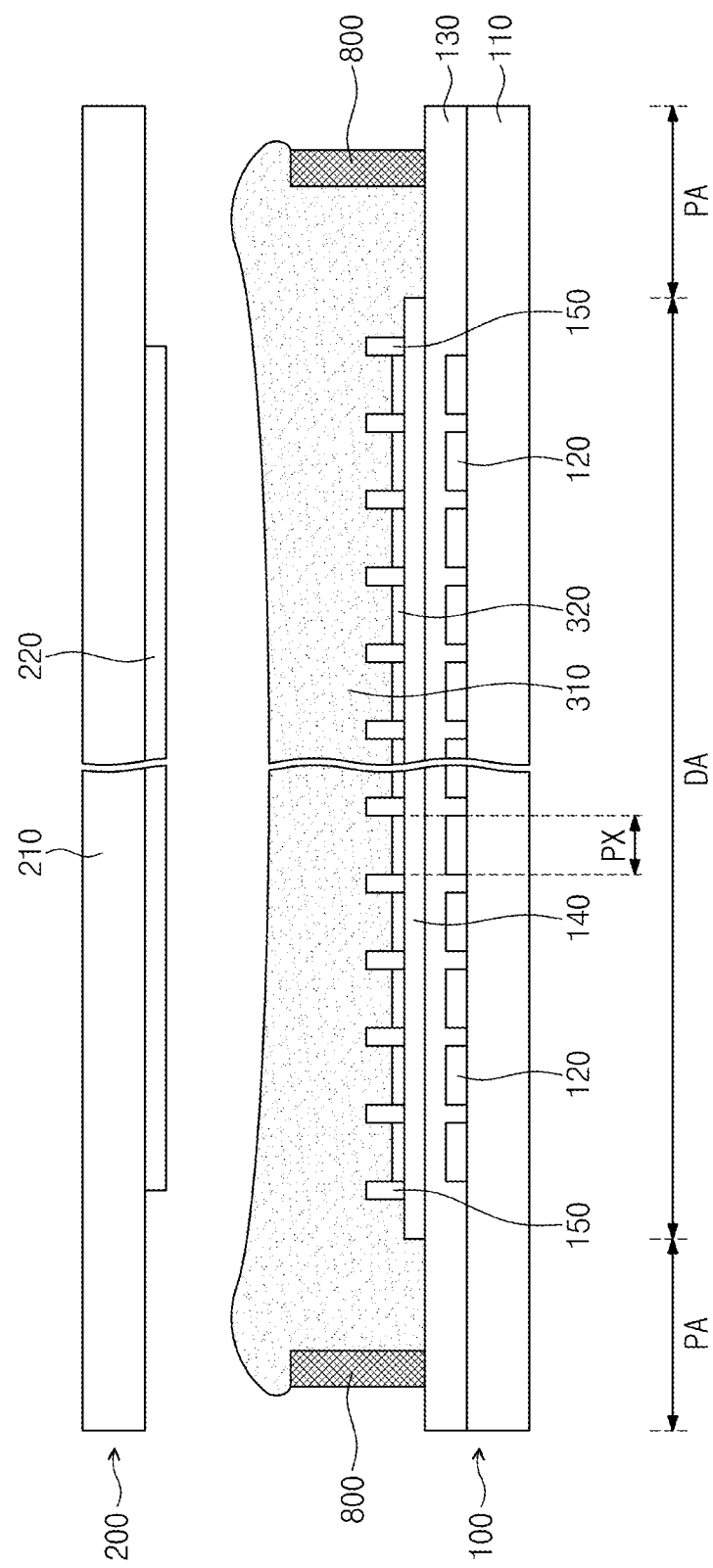

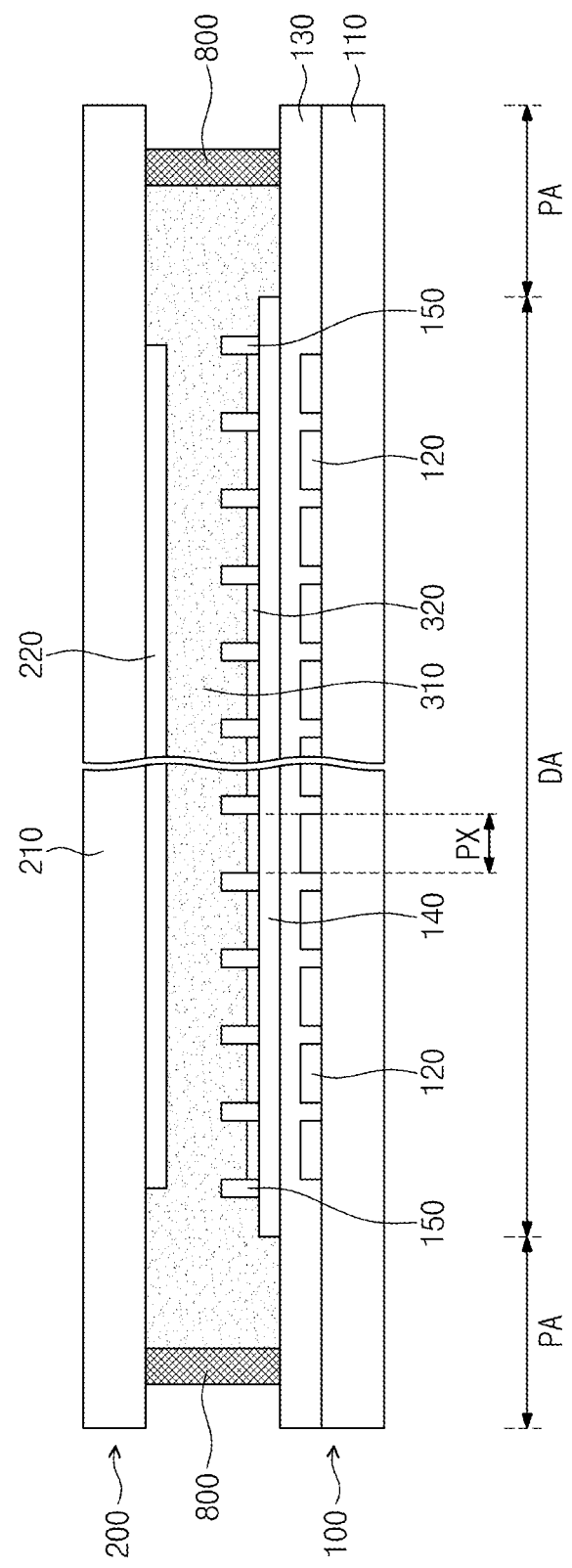

ELECTROWETTING DISPLAY PANEL AND METHOD OF MANUFACTURING THE SAME

CROSS-REFERENCE TO RELATED APPLICATION

This application claims priority from and the benefit of Korean Patent Application No. 10-2012-0049086 filed on May 9, 2012, which is hereby incorporated by reference for all purpose as if fully set forth herein.

BACKGROUND

1. Field of Disclosure

Exemplary embodiments of the present invention relate to electrowetting display panel and a method of manufacturing the same. More particularly, exemplary embodiments of the present invention relate to an electrowetting display panel capable of reducing electrolyte loss and a method of manufacturing the electrowetting display panel.

2. Description of the Related Art

An electrowetting display panel is showing much potential as a next generation display device because of its various desirable properties, such as fast response speed, low driving voltage, slim size, etc.

An electrowetting display panel displays images by using an electrowetting phenomenon that causes a fluid to move in response to a voltage being applied to the fluid. The voltage changes the surface tension of the fluid, which in turn makes the fluid move or changes its "shape." The fluid is controlled using a relatively low voltage, and thus power consumption is low.

An electrowetting layer for the electrowetting display panel is manufactured by loading an array substrate and a cover substrate into an electrolyte bath and coupling the array substrate and the cover substrate. During this process, a large electrolyte bath is required and a large amount of electrolyte solution is wasted.

SUMMARY

Exemplary embodiments of the present invention relate to an electrowetting display panel capable of reducing loss in amount of electrolyte.

Exemplary embodiments of the present invention relate to a method of manufacturing the electrowetting display panel.

Additional features of the invention will be set forth in the description which follows, and in part will be apparent from the description, or may be learned by practice of the invention.

An exemplary embodiment of the present invention discloses an electrowetting display panel includes an array substrate, opposite cover substrate, an electrowetting layer, and a hydrophobic pattern. The array substrate includes a display area and a peripheral area surrounding the display area and the cover substrate faces the array substrate. The electrowetting layer is disposed between the array substrate and the cover substrate and includes a polar fluid as a first fluid and a non-polar fluid as a second fluid. The hydrophobic pattern is disposed in the peripheral area.

The hydrophobic pattern may include one of an alkyl group-containing compound, a fluorine-containing compound, and a silicon nano-wire having an oxygen-adsorbed surface, and the hydrophobic pattern and the first fluid have a contact angle equal to or greater than about 150 degrees.

The array substrate may include a first base substrate that includes a plurality of pixel areas and a partition wall disposed between the pixel areas, and the hydrophobic pattern has a thickness smaller than a thickness of the partition wall.

The hydrophobic pattern may include a mixture of one of a heat-curable resin and a light-curable resin and one of an alkyl-containing compound, a fluorine-containing compound and a silicon nano-wire having an oxygen-adsorbed surface.

The electrowetting display device may further include a sealing pattern having a closed-loop shape to surround the display area, and the hydrophobic pattern is disposed between the display area and the sealing pattern.

An exemplary embodiment of the present invention discloses a method of manufacturing an electrowetting display panel that includes: preparing an array substrate that includes a display area and a peripheral area surrounding the display area, disposing a hydrophobic pattern in the peripheral area, preparing opposite cover substrate to face the array substrate, disposing an electrowetting layer that includes a first fluid as a polar fluid and a second fluid as a non-polar fluid in a space defined by the array substrate and the hydrophobic pattern, and coupling the array substrate to the cover substrate.

According to the above, the electrowetting display panel may include the hydrophobic pattern, and thus the electrowetting display panel may reduce loss in amount of electrolyte.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention:

FIGS. 15 and 16 are cross-sectional views explaining a method of manufacturing an electrowetting display panel according to another exemplary embodiment of the present invention.

DETAILED DESCRIPTION

Figure 1:
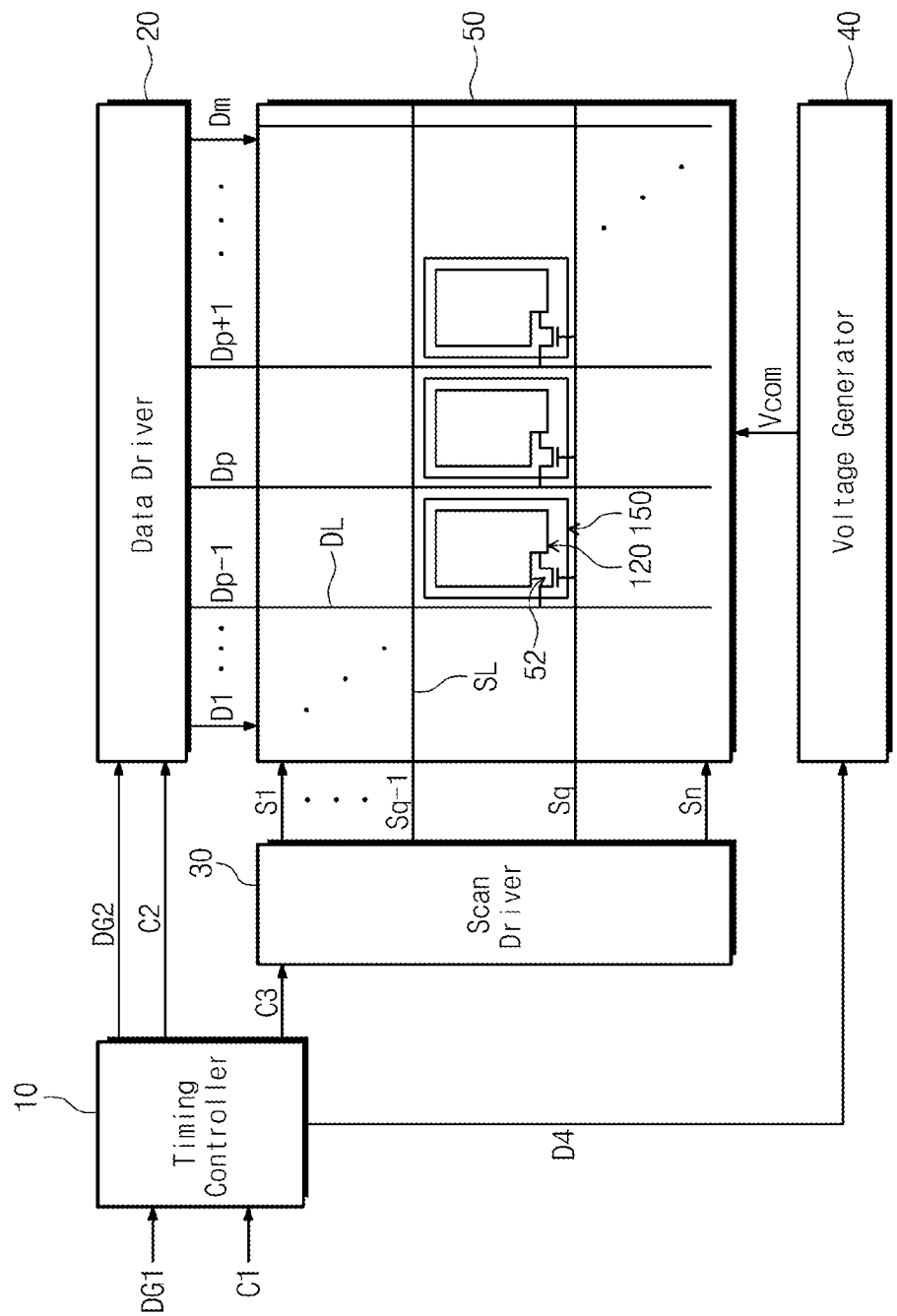
FIG. 1 is a block diagram showing an electrowetting display device according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items. It will be understood that for purposes of this disclosure, "at least one of X, Y, and Z" can be construed as X only, Y only, Z only, or any combination of two or more items X, Y, and Z (e.g., XYZ, XYY, YZ, ZZ).

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be explained in detail with reference to the accompanying drawings.

FIG. 1 is a block diagram showing an electrowetting display device according to an exemplary embodiment of the present invention.

Referring to FIG. 1, the electrowetting display device includes a timing controller 10, a data driver 20, a scan driver 30, a voltage generator 40, and an electrowetting display panel 50. The electrowetting display panel 50 is driven by the timing controller 10, the data driver 20, the scan driver 30, and the voltage generator 40.

Responsive to a first gray-scale data signal DG1 and a first control signal C1 from an external source, e.g., a graphic controller, the timing controller 10 applies a second gray-scale data signal DG2 and a second control signal C2 to the data driver 20, applies a third control signal C3 to the scan driver 30, and applies a fourth control signal C4 to the voltage generator 40.

The data driver 20 converts the second gray-scale data signal DG2 to gray-scale voltages, i.e., data signals, and applies the data signals D1, . . . , Dp−1, Dp, Dp+1, . . . , Dm to the electrowetting display panel 50.

The scan driver 30 sequentially applies scan signals S1, . . . , Sq−1, Sq, . . . , Sn to the electrowetting display panel 50 in response to the third control signal C3.

The voltage generator 40 applies a common voltage Vcom to the electrowetting display panel 50 in response to the fourth control signal C4. Although not shown in figures, the voltage generator 40 generates various voltages required by the timing controller 10, the data driver 20, and the scan driver 30.

The electrowetting display panel 50 includes m data lines DL, i.e., source lines, to transmit the data voltages and n gate lines SL, i.e., scan lines, to transmit a gate-on signal.

Pixel areas are positioned adjacent to crossing points of the data lines DL and the gate lines SL crossing the data lines DL. Each pixel area includes a thin film transistor 52, a pixel electrode 120, and a partition wall 150. The thin film transistor 52 includes a gate electrode electrically connected to a corresponding scan line of the scan lines SL, a source electrode electrically connected to a corresponding data line of the data lines, and a drain electrode (not shown) electrically connected to the pixel electrode 120.

The partition wall 150 surrounds the pixel electrode 120 to define a predetermined area, and a conductive coloring liquid (or a conductive water drop) is accommodated in the predetermined area. The conductive coloring liquid is dispersed or united in response to an electric potential difference between voltages respectively applied to the pixel electrode 120 disposed under the conductive coloring liquid and a common electrode (not shown) disposed above the conductive coloring liquid. The common electrode is applied with the common voltages Vcom.

Figure 2:
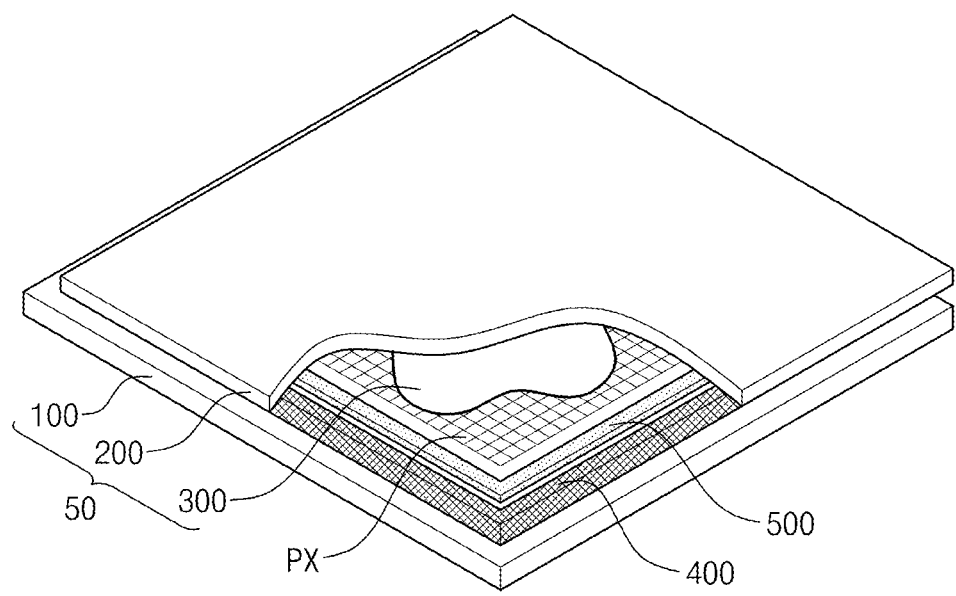
FIG. 2 is a partially cut-away perspective view showing an electrowetting display panel of the electrowetting display device shown in FIG. 1.
Figure 3:
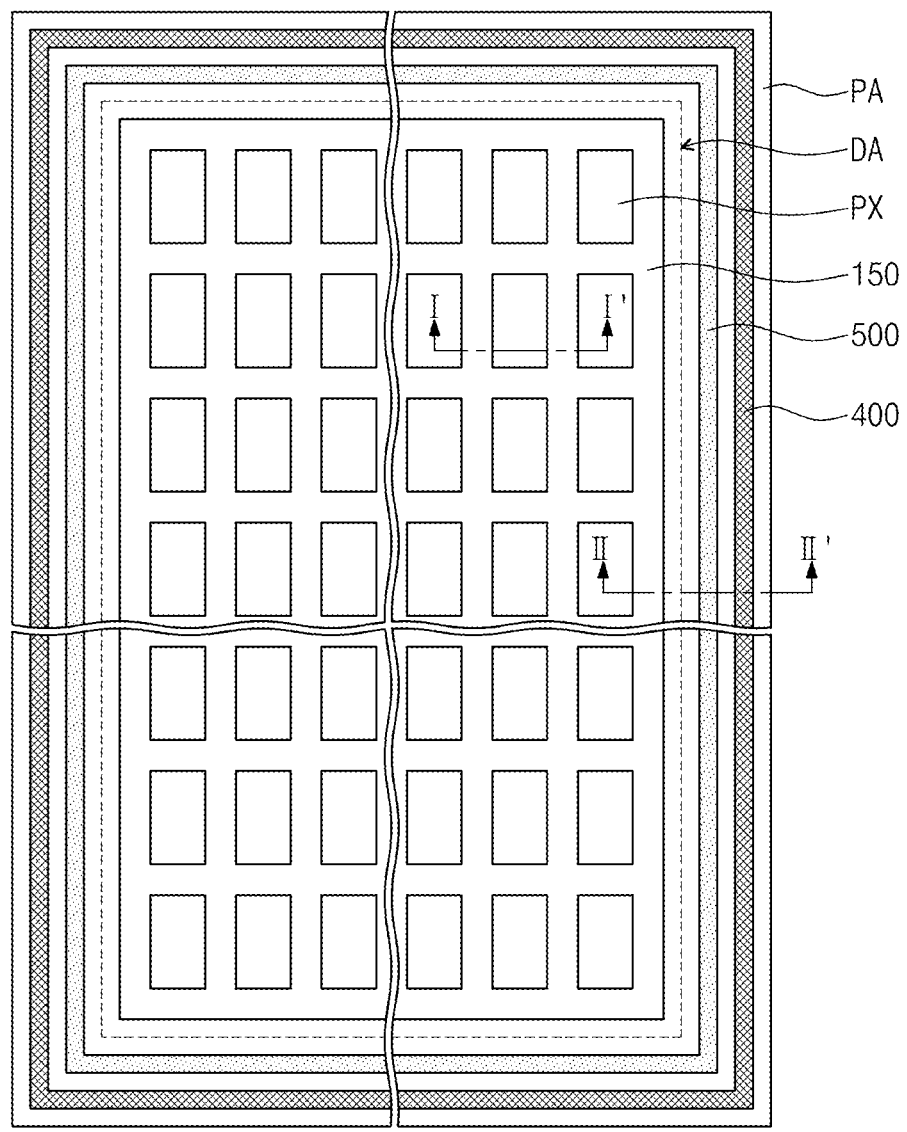
FIG. 3 is a plan view showing the electrowetting display panel shown in FIG. 2.
Figure 4:
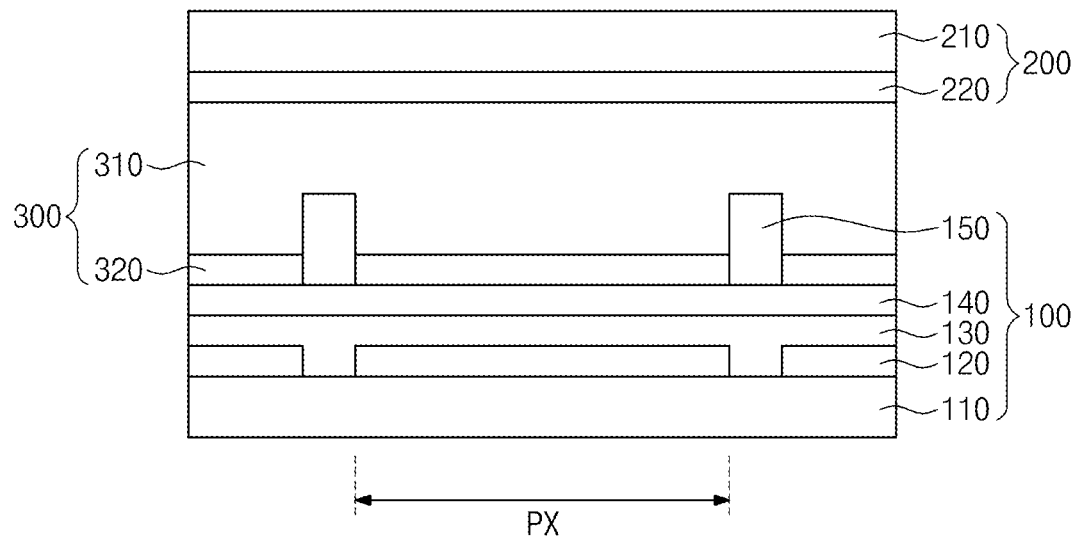
FIGS. 4 and 5 are cross-sectional views explaining an operation of the electrowetting display panel taken along a line I-I' of FIG. 3.
Figure 5:
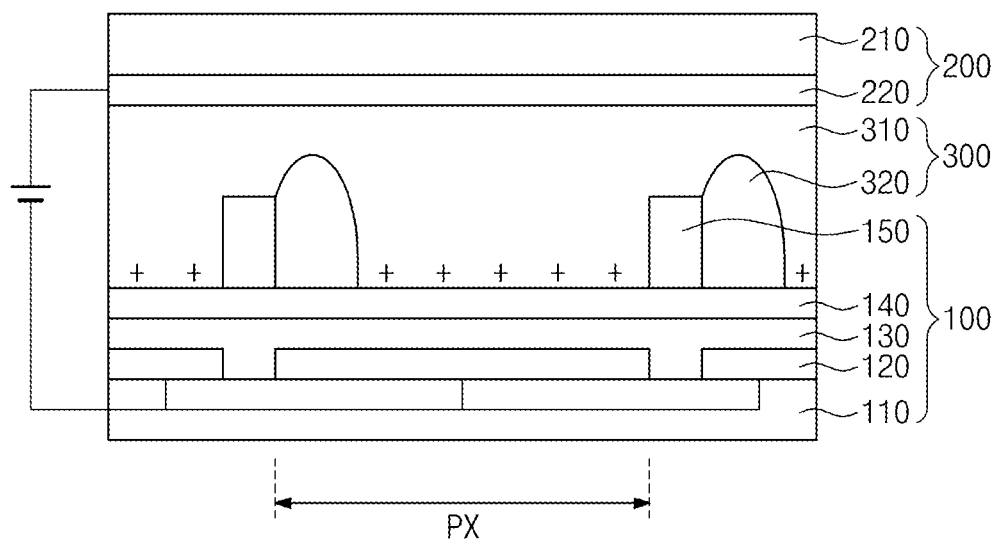
Figure 6:
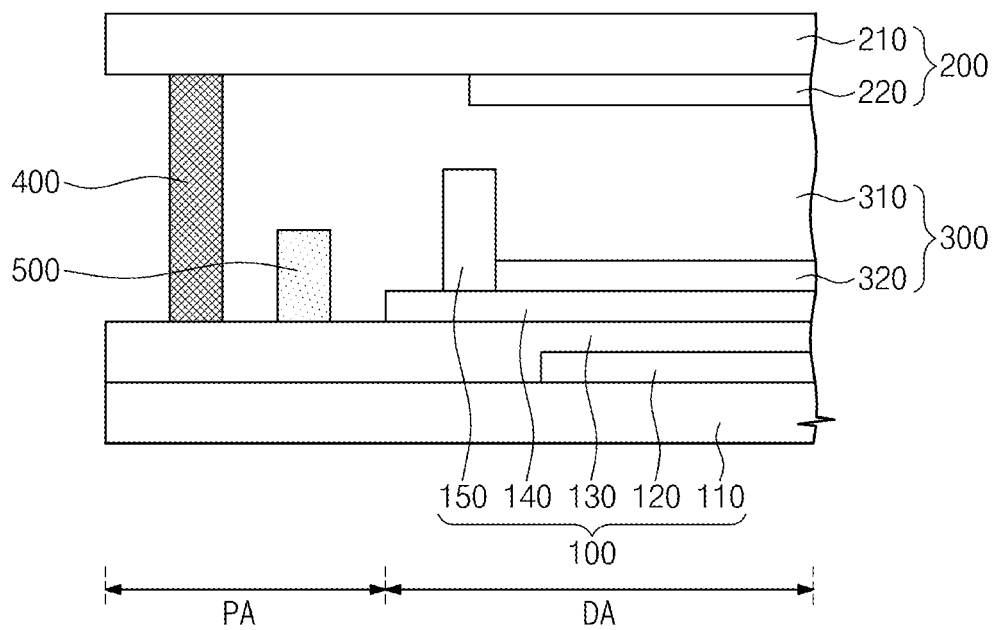
FIG. 6 is a cross-sectional view taken along a line II-II' of FIG. 3.

FIG. 2 is a partially cut-away perspective view showing an electrowetting display panel of the electrowetting display device shown in FIG. 1, and FIG. 3 is a plan view showing the electrowetting display panel shown in FIG. 2. FIGS. 4 and 5 are cross-sectional views explaining an operation of the electrowetting display panel taken along a line I-I' of FIG. 3, and FIG. 6 is a cross-sectional view taken along a line II-II' of FIG. 3.

Referring to FIGS. 2 to 6, the electrowetting display panel 50 of the electrowetting display device includes an array substrate 100 that includes a display area DA and a peripheral area PA, a cover substrate 200 facing the array substrate 100, an electrowetting layer 300 disposed between the array substrate 100 and the cover substrate 200, a sealing pattern 400 that couples the array substrate 100 and the cover substrate 200 to prevent the electrowetting layer 300 from leaking, and a first hydrophobic pattern 500 disposed between the sealing pattern 400 and the display area DA.

The array substrate 100 includes a first base substrate 110 on which a plurality of pixel areas PX is arranged, the pixel electrode 120 arranged in each pixel area PX, an insulating layer 130 that covers the pixel electrode 120, a hydrophobic layer 140 disposed on the insulating layer 130, and the partition wall 150 disposed between the pixel areas PX.

In addition, the pixel areas PX are arranged in the display area DA of the first base substrate 100 in a matrix form. The peripheral area PA surrounds the display area DA, and circuits, such as the timing controller 10, the data driver 20, the scan driver 30, and the voltage generator 40 are arranged in the peripheral area PA. In addition, each pixel area PX includes the gate line SL extending in a first direction D1 substantially parallel to a side of the array substrate 100 and a data line DL extending in a second direction substantially perpendicular to the first direction. Accordingly, the data line DL is insulated from and crosses the gate line SL. In addition, each pixel area PX includes the thin film transistor 52 electrically connected to the gate line SL and the data line DL.

The first base substrate 110 may be formed of a transparent insulating material, e.g., a polymer such as glass or plastic. When the first base substrate 110 is a plastic substrate, the first base substrate 110 may include polyethylene terephthalate (PET), fiber reinforced plastic (FRP), or polyethylene naphthalate (PEN). In addition, the first base substrate 110 is a hard or flexible substrate.

When the electrowetting display panel 50 is a transmission type, the pixel electrode 120 may have a single-layer structure of a transparent conductive material, such as indium tin oxide (ITO) or indium zinc oxide (IZO). In addition, when the electrowetting display panel 50 is a reflection type, the pixel electrode 120 may have a multi-layer structure. For instance, in some embodiments, the pixel electrode 120 includes a first conductive layer (not shown) disposed in each pixel PX and connected to the thin film transistor 52 and a second conductive layer (not shown) disposed on the first conductive layer. In this case, one of the first conductive layer and the second conductive layer includes the transparent conductive oxide such as indium tin oxide or indium zinc oxide. Further, the other one of the first conductive layer and the second conductive layer includes a metal material with conductivity to reflect light from an external source (hereinafter, referred to as external light).

The insulating layer 130 includes an insulating material through which the light transmits. For example, the insulating layer 130 may include silicon oxide material or silicon nitride material. In addition, when the electrowetting display panel 50 is the reflection type, the insulating layer 130 includes a material that reflects the external light. For instance, the insulating layer 130 includes a white photoresist that reflects the external light. The insulating layer 130 has a single-layer structure or a multi-layer structure, or may be omitted.

The hydrophobic layer 140 includes at least one hydrophobic organic resin selected from the group consisting of fluoropolymer, polyxylene-based resin, polypropylene-based resin, siloxane-based resin, and combination thereof and at least one hydrophobic inorganic particle selected from the group consisting of $SiO_2$, $Al_2O_3$, ZnO, $TiO_2$, BST (Barium Strontium Titanate), and combination thereof. The hydrophobic layer 140 may be transparent when the electrowetting display panel 50 is the transmission type. In addition, when the electrowetting display panel 50 is the reflection type, the hydrophobic layer 140 has a white color and reflects a specific wavelength of the external light, thereby displaying a desired color.

The partition wall 150 is disposed on the hydrophobic layer 140 to provide the space defined by the first base substrate 110 and the partition wall 150. The space may correspond to a pixel area PX. Thus, a range of the pixel area PX is limited by the partition wall 150. In the present exemplary embodiment, the partition wall 150 is disposed on the first base substrate 110 and defines the pixel area PX with the partition wall 150. However, pixel area PX is not limited to being defined in this manner. For instance, in some embodiments, the pixel area PX may be defined by the first base substrate 110, the cover substrate 200, and the partition wall 150.

The cover substrate 200 includes a second base substrate 210 and the common electrode 220 facing the pixel electrode 120. In addition, the cover substrate 200 may further include an insulating layer (not shown) that covers the common electrode 220 and has a hydrophilic surface.

The second base substrate 210 may be formed of the same material as the first base substrate 110. That is, the second base substrate 210 may be a transparent insulating material, such as glass, plastic, etc.

The common electrode 220 receives the common voltage and is formed of the transparent conductive material, such as indium tin oxide, indium zinc oxide, etc. so as to allow the external light from the second base substrate 210 to travel to the electrowetting layer 300.

The electrowetting layer 300 is accommodated in the pixel area PX defined by the partition wall 150 and the first base substrate 110 or the second base substrate 210. The electrowetting layer 300 includes a first fluid 310 and a second fluid 320. The first fluid 310 and the second fluid 320 have different specific gravities from each other and are not mixed with each other. For example, the second fluid 320 may have a specific gravity greater than the specific gravity of the first fluid 310.

In addition, one of the first fluid 310 and the second fluid, e.g., the first fluid 310, may be a polar fluid and the other a non-polar fluid. In one embodiment, the first fluid 310 is a polar fluid such as an electrolyte solution (e.g., a mixture of water and ethyl alcohol) in which potassium chloride is dissolved. The first fluid 310 transmits light. The second fluid 320 may be non-polar oil (e.g., silicon oil) and include a black dye or a material absorbing the external light so as to serve a light shutter that blocks or transmits the external light. In addition, the second fluid 320 includes a color dye to reflect the specific wavelength of the external light.

The sealing pattern 400 is disposed in the peripheral area PA and has a closed-loop shape surrounding the display area DA. The sealing pattern 400 maintains a gap between the array substrate 100 and the cover substrate 200 and prevents the electrowetting layer 300 from leaking. In addition, the sealing pattern 400 may include a heat-curable resin or a light-curable resin.

The first hydrophobic pattern 500 is disposed between the display area DA and the sealing pattern 400 and has a closed-loop shape surrounding the display area DA. In addition, the first hydrophobic pattern 500 has a thickness smaller than a thickness of the partition wall 150. In detail, the first hydrophobic pattern 500 has the thickness of about 2 micrometers to about 10 micrometers. Accordingly, the first hydrophobic pattern 500 forms a predetermined space together with the array substrate 100.

The first hydrophobic pattern 500 has super-hydrophobicity and has a contact angle with respect to the polar fluid of about 150° or more. The first hydrophobic pattern 500 includes an alkyl group-containing compound, e.g., at least one of alkyl ketone dimer (AKD), dialkyl ketone (DAK), and alkyl silane. In addition, the first hydrophobic pattern 500 may include a polytetrafluoro-ethylene (PTFE) that contains fluorine. Further, the first hydrophobic pattern 500 may include a silicon nano-wire having an oxygen-adsorbed surface.

Hereinafter, an operation of the electrowetting display device will be described in detail.

In the case that the voltages are not applied to the pixel electrode 120 and the common electrode 220, no electric potential difference occurs between the pixel electrode 120 and the common electrode 220, and thus the change of interfacial tension does not exist between the first fluid 310 and the second fluid 320. In this case, since the hydrophobic layer 140 has hydrophobicity or lipophilicity, the second fluid 320 is uniformly dispersed on the hydrophobic layer 140 as shown in FIG. 4. In addition, the second fluid 320 includes the black dye or the material absorbing the light, and thus the second fluid 320 blocks or absorbs the external light. Accordingly, the electrowetting display device is in a dark state.

When voltages are respectively applied to the pixel electrode 120 and the common electrode 220, an electric potential difference forms between the pixel electrode 120 and the common electrode 220, a change of the interfacial tension is caused between the first fluid 310 and the second fluid 320. Where the first fluid 310 is the polar fluid, the second fluid 320 moves to an area adjacent to the partition wall 150 as shown in FIG. 5. This leaves the first fluid 310 covering the pixel areas PX so that the electrowetting display panel 50 is in a state in which the external light passes through the electrowetting display panel 50. Accordingly, when the electrowetting display panel 50 is the reflection type, the external light passes through the cover substrate 200 and the electrowetting layer 300, is reflected by the pixel electrode 120 or the insulating layer 130, and passes through the electrowetting layer 300 again to travel to the outside of the electrowetting display panel 50. Therefore, the electrowetting display device is in a bright state.

Meanwhile, when the electrowetting display panel 50 is the transmission type, the external light may be provided to the electrowetting display panel 50 through the backlight unit (not shown). The external light provided to the electrowetting display panel 50 sequentially passes through the array substrate 100, the electrowetting layer 300, and the cover substrate 200 and travels to the outside of the electrowetting display panel 50. Thus, the electrowetting display device is in the bright state.

Figure 7:
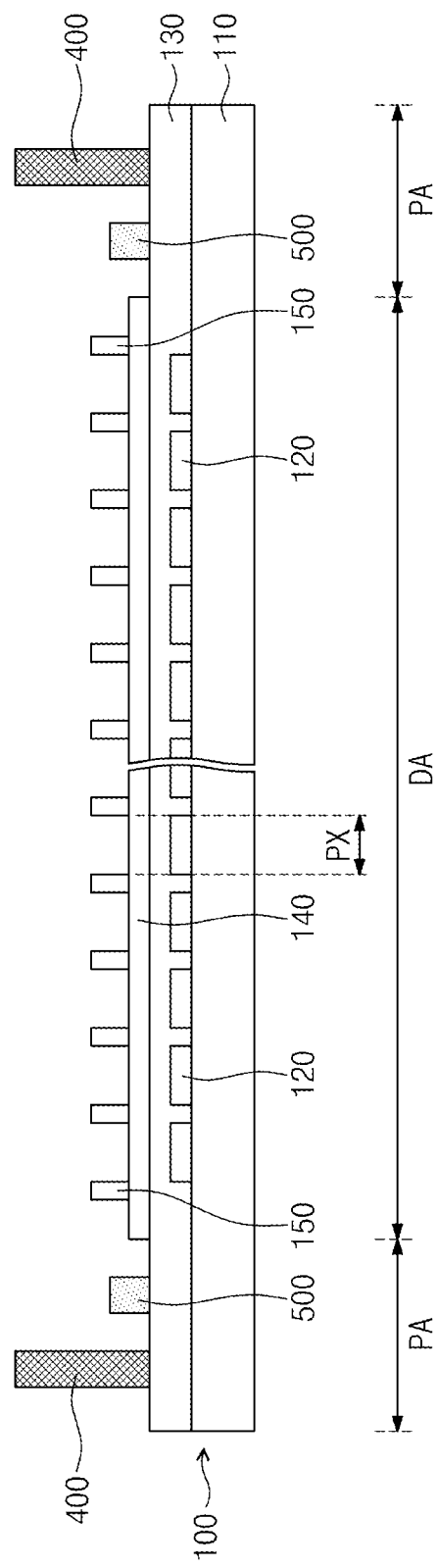
FIGS. 7, 8, and 10 are cross-sectional views explaining a method of manufacturing the electrowetting display panel shown in FIG. 1.
Figure 8:
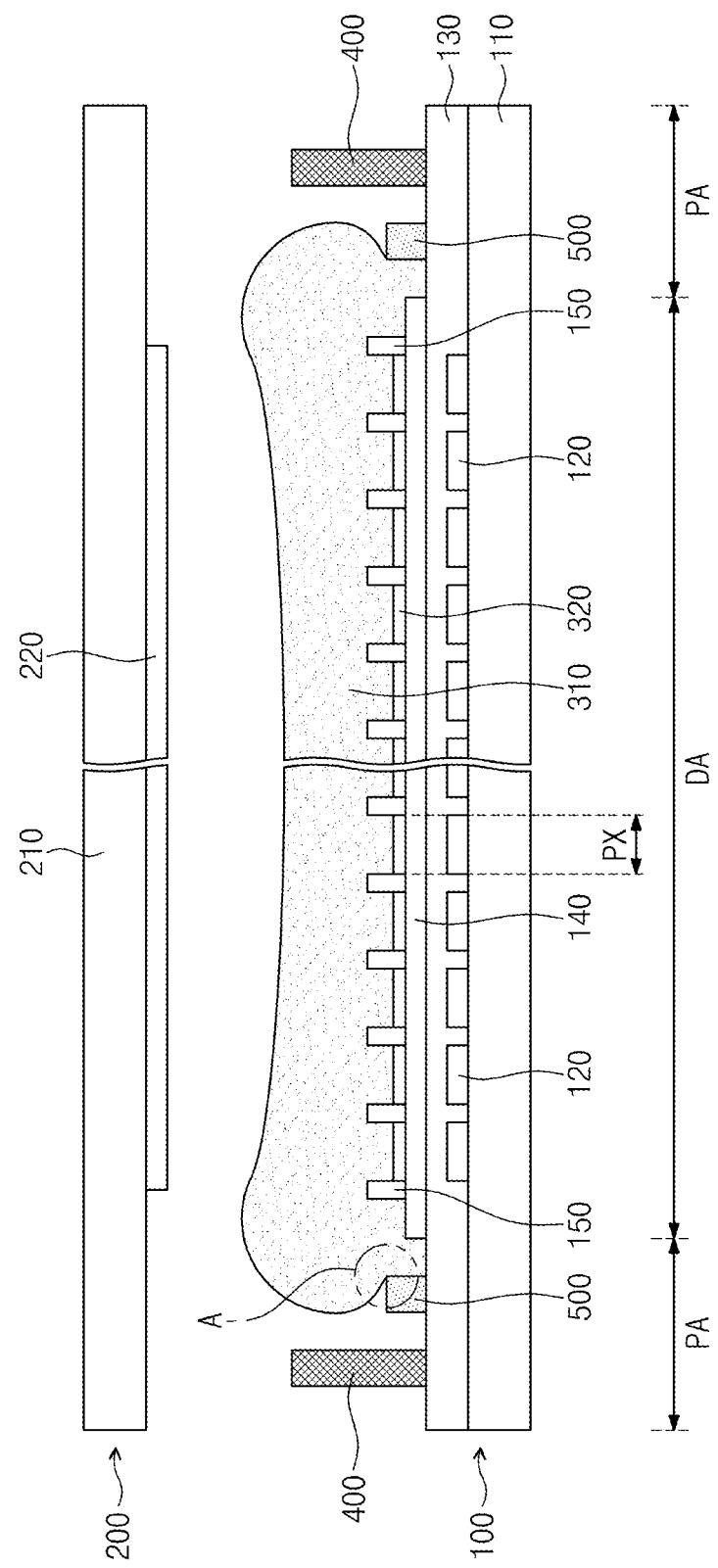
Figure 9:
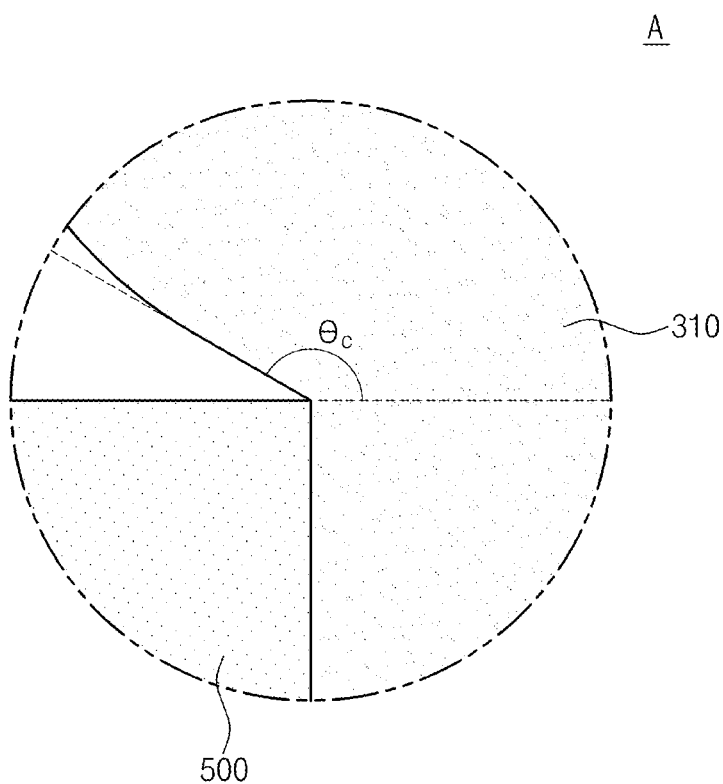
FIG. 9 is a partially enlarged view showing a portion "A" of FIG. 8.
Figure 10:
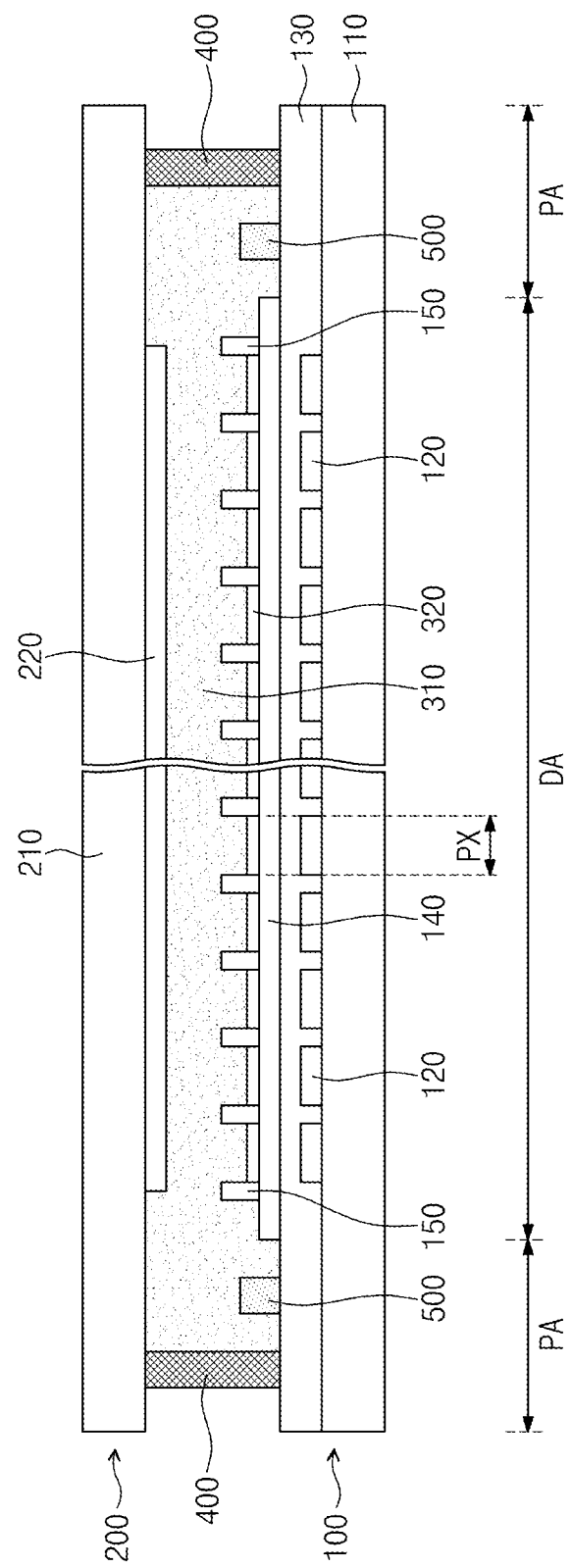

FIGS. 7, 8, and 10 are cross-sectional views explaining a method of manufacturing the electrowetting display panel shown in FIG. 1 and FIG. 9 is a partially enlarged view showing a portion "A" of FIG. 8.

Referring to FIG. 7, the pixel electrode 120 is formed on the first base substrate 110, in which the pixel areas are defined, to correspond to each pixel area.

The first base substrate 110 includes the display area DA in which the pixel areas are arranged in a matrix form and the peripheral area PA surround the display area DA. The first base substrate 110 is formed of a transparent insulating material.

When the electrowetting display panel 50 is the transmission type, the pixel electrode 120 may have the single-layer structure of the transparent conductive material. In addition, when the electrowetting display panel 50 is the reflection type, the pixel electrode 120 may have the multi-layer structure of the transparent conductive layer and the conductive reflective layer. Further, the pixel electrode 120 is electrically connected to the thin film transistor disposed in each pixel of the first base substrate 110.

After the pixel electrode 120 is formed, the insulating layer 130 is formed to cover the pixel electrode 120. The insulating layer 130 may include an insulating material that transmits light, e.g., silicon nitride material or silicon oxide material. In addition, when the electrowetting display panel 50 is the reflection type, the insulating layer 130 includes the white photoresist that reflects external light.

Then, the hydrophobic layer 140 is formed on the insulating layer 130. The hydrophobic layer 140 includes at least one hydrophobic organic resin selected from the group consisting of fluoropolymer, polyxylene-based resin, polypropylene-based resin, siloxane-based resin, and combination thereof and at least one hydrophobic inorganic particle selected from the group consisting of $SiO_2$, $Al_2O_3$, ZnO, $TiO_2$, BST (Barium Strontium Titanate), and combination thereof.

When the hydrophobic layer 140 is formed, the partition wall 150 is formed on the hydrophobic layer 140. The partition layer 150 surrounds the pixel electrode 120 to form the space defined by the first base substrate 110 and the partition wall 150. The space may correspond to each pixel area PX.

After that, the sealing pattern 400 is formed in the peripheral area PA to have a closed-loop shape surrounding the display area DA. The sealing pattern 400 may include the heat-curable resin or the light-curable resin and may be formed by using a squeeze method or an inkjet method.

Then, the first hydrophobic pattern 500 is formed between the display area DA and the sealing pattern 400. The first hydrophobic pattern 500 has a closed-loop shape surrounding the display area DA. The first hydrophobic pattern 500 has super-hydrophobicity and has a contact angle with respect to the polar fluid of about 150° or more.

The first hydrophobic pattern 500 has super-hydrophobicity and forms a predetermined space together with the array substrate 100, and thus the polar fluid is accommodated in the area surrounded by the first hydrophobic pattern 500 on the array substrate 100.

Referring to FIG. 8, after the first hydrophobic pattern 500 is formed, the second fluid 320, which is the non-polar fluid, is accommodated in the space formed by the first base substrate 110 and the partition wall 150, which corresponds to each pixel area PX. Then, the first fluid 310, which is the polar fluid, is accommodated in the space defined by the first hydrophobic pattern 500 and the array substrate 100. In this case, the first fluid 310 has a contact angle θc equal to or greater than about 150 degrees with respect to the first hydrophobic pattern 500.

Since the first fluid 310 has a surface tension, the first fluid 310 may exist only in the space defined by the first hydrophobic pattern 500 and the array substrate 100.

After the first fluid 310 and the second fluid 320 are accommodated, the cover substrate 200 is prepared by disposing the common electrode 220 on the second base substrate 210. The cover substrate 200 is disposed such that the common electrode 220 faces the pixel electrode 120 of the array substrate 100.

Referring to FIG. 10, after preparing the cover substrate 200, the array substrate 100 and the cover substrate 200 are coupled to each other. The array substrate 100 and the cover substrate 200 are coupled to each other by the sealing pattern 400.

In FIG. 8, which depicts the state of the electrowetting layer 300 before the cover substrate 200 is coupled, shows that the level of the first fluid 310 is higher than the height of the hydrophobic pattern 500. In spite of this excess fluid level, there is hardly any spillage because the hydrophobic nature of the pattern 500 keeps the polar first fluid 310 inside the area defined by the sealing pattern 400. When the cover substrate 200 is coupled as shown in FIG. 10, it pushes down on the upper portion of the first fluid 310 and forces it into the space between the hydrophobic pattern 500 and the sealing pattern 400. Without the hydrophobic pattern 500, there would be spillage of the electrowetting layer 300 outside the boundaries of the sealing pattern 400, wasting the first fluid 310 and creating a mess.

When the array substrate 100 and the cover substrate 200 are coupled to each other, the sealing pattern 400 is cured. The sealing pattern 400 may be cured by heating the sealing pattern 400 when the sealing pattern 400 includes the heat-curable resin. In addition, when the sealing pattern 400 includes the light-curable resin, a visible ray or an ultraviolet ray is irradiated to the sealing pattern 400 in accordance with the light-curable resin, thereby curing the sealing pattern 400.

Hereinafter, various electrowetting display devices according to another exemplary embodiment of the present invention will be described with reference to FIGS. 11 to 16. In FIGS. 11 to 16, the same reference numerals denote the same elements in FIGS. 1 to 10, and thus detailed descriptions of the same elements will be omitted in order to avoid redundancy.

Figure 11:
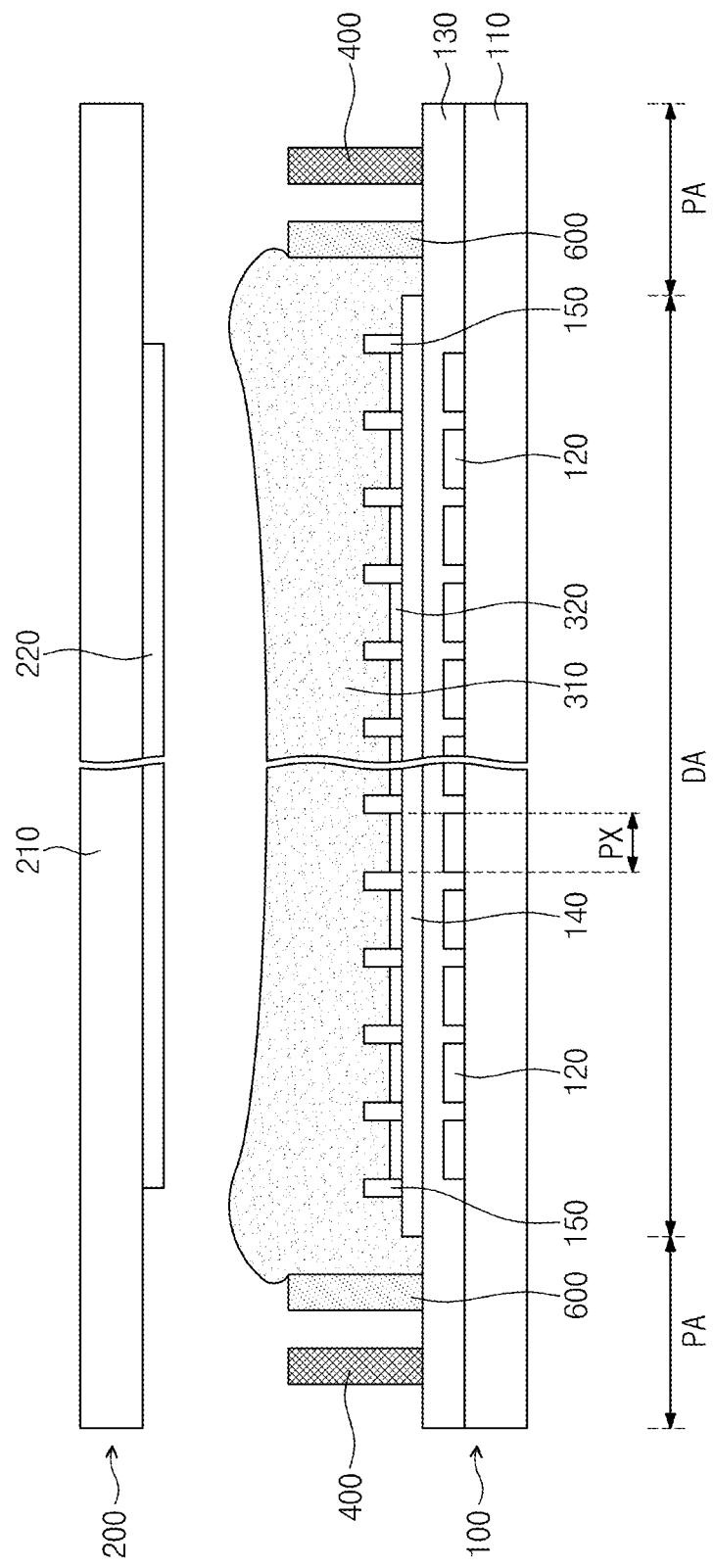
FIGS. 11 and 12 are cross-sectional views explaining a method of manufacturing an electrowetting display panel according to another exemplary embodiment of the present invention.
Figure 12:
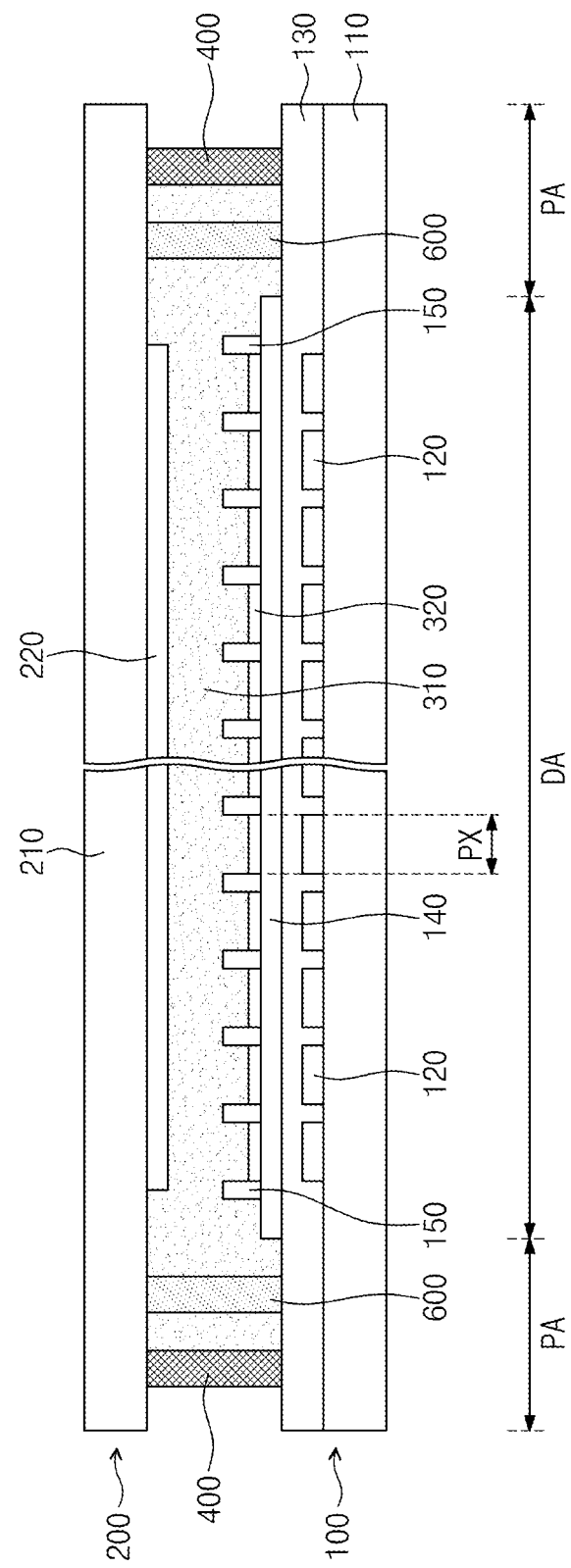

FIGS. 11 and 12 are cross-sectional views explaining a method of manufacturing an electrowetting display panel according to another exemplary embodiment of the present invention.

The electrowetting display panel according to another exemplary embodiment includes a sealing pattern 400 disposed in the peripheral area PA and a second hydrophobic pattern 600 disposed between the sealing pattern 400 and the display area DA.

Referring to FIG. 11, an array substrate 100 is prepared. The array substrate 100 includes a first base substrate 110 in which a plurality of pixel areas PX is defined, a pixel electrode 120 disposed in each pixel area PX, an insulating layer 130 that covers the pixel electrode 120, a hydrophobic layer 140 disposed on the insulating layer 130, and a partition wall 150 disposed between the pixel areas PX. The pixel areas PX are arranged in the display area DA in a matrix form and the peripheral area PA surrounds the display area DA.

After the array substrate 100 is prepared, the sealing pattern 400 is disposed in the peripheral area PA to have a closed-loop shape surrounding the display area DA.

Then, the second hydrophobic pattern 600 is formed between the display area DA and the sealing pattern 400. In this case, the second hydrophobic pattern 600 may have a closed-loop shape to surround the display area DA. In addition, the second hydrophobic pattern 600 includes the same material and hydrophobic material as those of the sealing pattern 400. For instance, the second hydrophobic pattern 600 includes a mixture of one of heat-curable resin and light-curable resin and one of an alkyl-containing compound, a fluorine-containing compound and a silicon nano-wire having an oxygen-adsorbed surface. The second hydrophobic pattern 600 has a contact angle with respect to the polar fluid, i.e., the first fluid 310, of about 110° or more.

After the second hydrophobic pattern 600 is formed, the second fluid 320, which is the non-polar fluid, is accommodated in the space surrounded by the first base substrate 110 and the partition wall 150, which corresponds to each pixel area PX. Then, the first fluid 310, which is the polar fluid, is accommodated in the space defined by the second hydrophobic pattern 600 and the array substrate 100.

After the first fluid 310 and the second fluid 320 are disposed on the array substrate 100, the cover substrate 200 is prepared and disposed such that the common electrode 220 of the cover substrate 200 faces the pixel electrode 120 of the array substrate 100.

Referring to FIG. 12, the array substrate 100 and the cover substrate 200 are coupled to each other. The array substrate 100 and the cover substrate 200 are coupled to each other by the sealing pattern 400 and the second hydrophobic pattern 600, which are of approximately the same height in the embodiment that is shown. As a result, the coupling force between the array substrate 100 and the cover substrate 200 may be stronger than that when the array substrate 100 and the cover substrate 200 are coupled to each other using only the sealing pattern 400.

When the array substrate 100 and the cover substrate 200 are coupled to each other, the sealing pattern 400 and the second hydrophobic pattern 600 are cured.

Figure 13:
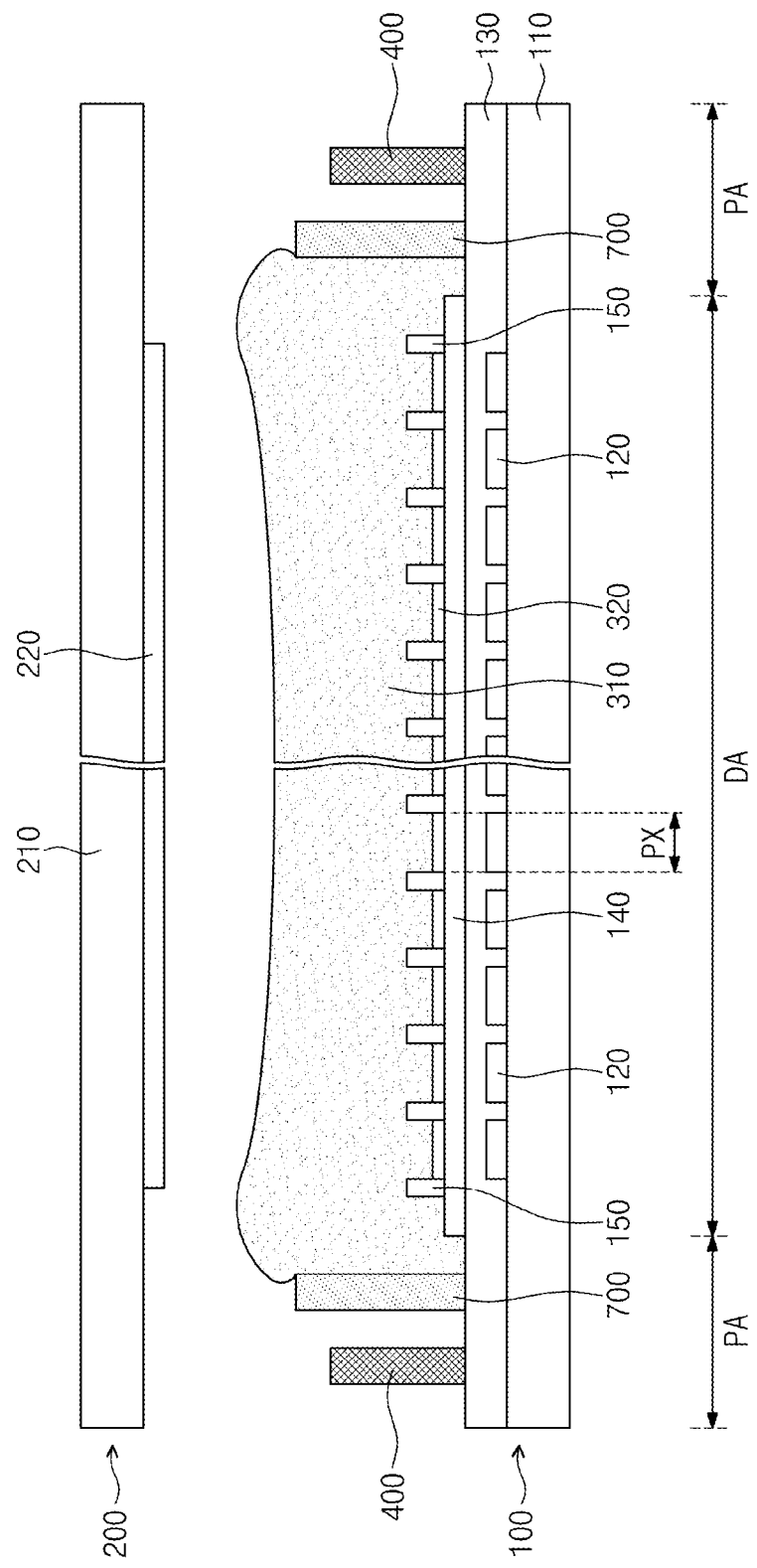
FIGS. 13 and 14 are cross-sectional views explaining a method of manufacturing an electrowetting display panel according to another exemplary embodiment of the present invention.
Figure 14:
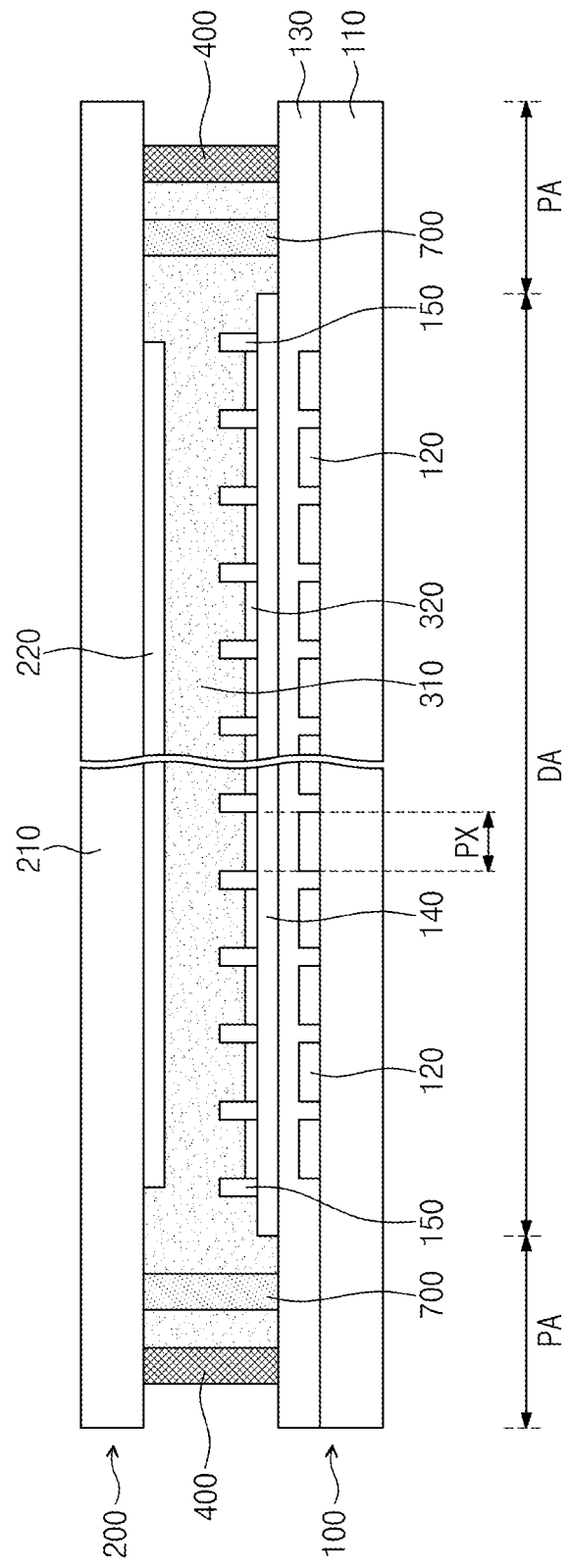

FIGS. 13 and 14 are cross-sectional views explaining a method of manufacturing an electrowetting display panel according to another exemplary embodiment of the present invention.

The electrowetting display panel according to another exemplary embodiment includes a sealing pattern 400 disposed in the peripheral area PA and a third hydrophobic pattern 700 disposed between the sealing pattern 400 and the display area DA.

Referring to FIG. 13, an array substrate 100 is prepared. The array substrate 100 includes a first base substrate 110 in which a plurality of pixel areas PX is defined, a pixel electrode 120 disposed in each pixel area PX, an insulating layer 130 that covers the pixel electrode 120, a hydrophobic layer 140 disposed on the insulating layer 130, and a partition wall 150 disposed between the pixel areas PX.

After the array substrate 100 is prepared, the sealing pattern 400 is disposed in the peripheral area PA to have a closed-loop shape surrounding the display area DA.

Then, the third hydrophobic pattern 700 is formed between the display area DA and the sealing pattern 400. In this case, the third hydrophobic pattern 700 may have a closed-loop shape to surround the display area DA and have a thickness greater than that of the sealing patter 400. In addition, the third hydrophobic pattern 700 includes an elastic material and a hydrophobic material or includes a material having elastic and hydrophobic properties. In detail, the third hydrophobic pattern 700 includes a carbon nanotube sponge or a hydrophobic polymer compound. The third hydrophobic pattern 700 has a contact angle with respect to the polar fluid, i.e., the first fluid 310, of about 110° or more.

After the third hydrophobic pattern 700 is formed, the first fluid 310 and the second fluid 320 are disposed on the array substrate 100 After that, the cover substrate 200 is prepared and disposed such that the common electrode 220 of the cover substrate 200 faces the array substrate 100.

Referring to FIG. 14, the array substrate 100 and the cover substrate 200 are coupled to each other, and then the sealing pattern 400 and the third hydrophobic pattern 700 are cured.

FIGS. 15 and 16 are cross-sectional views explaining a method of manufacturing an electrowetting display panel according to another exemplary embodiment of the present invention.

The electrowetting display panel according to another exemplary embodiment includes a fourth hydrophobic pattern 800 disposed in the peripheral area PA and used to couple the array substrate 100 and the cover substrate 200.

Referring to FIG. 15, the array substrate 100 is prepared. The array substrate 100 includes a first base substrate 110 in which a plurality of pixel areas PX is defined, a pixel electrode 120 disposed in each pixel area PX, an insulating layer 130 that covers the pixel electrode 120, a hydrophobic layer 140 disposed on the insulating layer 130, and a partition wall 150 disposed between the pixel areas PX.

After the array substrate 100 is prepared, the fourth hydrophobic pattern 800 is disposed in the peripheral area PA to have a closed-loop shape surrounding the display area DA. In the present exemplary embodiment, the fourth hydrophobic pattern 800 may include the same material and hydrophobic material as those of a conventional sealing pattern. In detail, the fourth hydrophobic pattern 800 includes a mixture of one of heat-curable resin and light-curable resin and one of an alkyl-containing compound, a fluorine-containing compound and a silicon nano-wire having an oxygen-adsorbed surface. The fourth hydrophobic pattern 800 has a contact angle with respect to the polar fluid, i.e., the first fluid 310, of about 110° or more.

After the fourth hydrophobic pattern 800 is disposed, the first fluid 310 and the second fluid 320 are disposed on the array substrate 100. Then, the cover substrate 200 is prepared and disposed such that the common electrode 220 of the cover substrate 200 faces the array substrate 100.

Referring to FIG. 16, the array substrate 100 and the cover substrate 200 are coupled to each other. The array substrate 100 and the cover substrate 200 are coupled to each other by using the fourth hydrophobic pattern 800. Accordingly, although a separate hydrophobic pattern is not prepared, the array substrate 100 and the cover substrate 200 are coupled to each other by the fourth hydrophobic pattern 800 having hydrophobicity.

When the array substrate 100 and the cover substrate 200 are coupled to each other, heat is applied to or light is irradiated to the fourth hydrophobic pattern 800, thereby curing the fourth hydrophobic pattern 800 are cured.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. An electrowetting display panel comprising:
    an array substrate including a display area and a peripheral area surrounding the display area;
    a cover substrate facing the array substrate;
    an electrowetting layer disposed between the array substrate and the cover substrate and including a polar fluid as a first fluid and a non-polar fluid as a second fluid; and
    a hydrophobic pattern disposed in the peripheral area.

2. The electrowetting display panel of claim 1, wherein the hydrophobic pattern has a closed-loop shape surrounding the display area.

3. The electrowetting display panel of claim 2, wherein the hydrophobic pattern comprises one of an alkyl group-containing compound, a fluorine-containing compound, and a silicon nano-wire having an oxygen-adsorbed surface.

4. The electrowetting display panel of claim 3, wherein the hydrophobic pattern and the first fluid have a contact angle equal to or greater than about 150 degrees.

5. The electrowetting display panel of claim 3, wherein the array substrate comprises:
    a first base substrate including a plurality of pixel areas; and
    a partition wall disposed between the pixel areas, wherein the hydrophobic pattern has a thickness smaller than a thickness of the partition wall.

6. The electrowetting display device of claim 5, wherein the thickness of the hydrophobic pattern is in a range of about 2 micrometers to about 10 micrometers.

7. The electrowetting display device of claim 2, wherein the hydrophobic pattern comprises a mixture of one of a heat-curable resin and a light-curable resin and one of an alkyl-containing compound, a fluorine-containing compound and a silicon nano-wire having an oxygen-adsorbed surface.

8. The electrowetting display device of claim 7, wherein the hydrophobic pattern and the first fluid have a contact angle equal to or greater than about 110 degrees.

9. The electrowetting display device of claim 2, further comprising a sealing pattern having a closed-loop shape to surround the display area, wherein the hydrophobic pattern is disposed between the display area and the sealing pattern.

10. The electrowetting display device of claim 9, wherein the hydrophobic pattern comprises a mixture of one of a heat-curable resin and a light-curable resin and one of an alkyl-containing compound, a fluorine-containing compound and a silicon nano-wire having an oxygen-adsorbed surface.

11. The electrowetting display device of claim 10, wherein the hydrophobic pattern and the first fluid have a contact angle equal to or greater than about 110 degrees.

12. The electrowetting display device of claim 9, wherein the hydrophobic pattern comprises one of a carbon nanotube sponge and a hydrophobic polymer compound.

13. The electrowetting display device of claim 12, wherein the hydrophobic pattern and the first fluid have a contact angle equal to or greater than about 110 degrees.

14. A method of manufacturing an electrowetting display panel, comprising:
    preparing an array substrate including a display area and a peripheral area surrounding the display area;
    disposing a hydrophobic pattern in the peripheral area;
    preparing a cover substrate to face the array substrate;
    disposing an electrowetting layer including a polar fluid as a first fluid and a non-polar fluid as a second fluid in a space defined by the array substrate and the hydrophobic pattern; and
    coupling the array substrate to the cover substrate.

15. The method of claim 14, wherein the hydrophobic pattern comprises a mixture of one of a heat-curable resin and a light-curable resin and one of an alkyl-containing compound, a fluorine-containing compound and a silicon nano-wire having an oxygen-adsorbed surface.

16. The method of claim 15, wherein the hydrophobic pattern and the first fluid have a contact angle equal to or greater than about 150 degrees.

17. The method of claim 14, wherein the array substrate comprises:
    a first base substrate that including a plurality of pixel areas; and
    a partition wall disposed between the pixel areas, and
    the hydrophobic pattern has a thickness smaller than a thickness of the partition wall.

18. The method of claim 14, wherein the hydrophobic pattern comprises a mixture of one of a heat-curable resin and a light-curable resin and one of an alkyl-containing compound, a fluorine-containing compound and a silicon nano-wire having an oxygen-adsorbed surface.

19. The method of claim 18, wherein the hydrophobic pattern and the first fluid have a contact angle equal to or greater than about 110 degrees.

20. The method of claim 14, further comprising forming a sealing pattern having a closed-loop shape surrounding the display area, wherein the hydrophobic pattern is disposed between the display area and the sealing pattern.

21. The method of claim 20, wherein the hydrophobic pattern comprises a mixture of one of a heat-curable resin and a light-curable resin and one of an alkyl-containing compound, a fluorine-containing compound and a silicon nanowire having an oxygen-adsorbed surface.

22. The method of claim 20, wherein the hydrophobic pattern comprises one of a carbon nanotube sponge and a hydrophobic polymer compound.

* * * * *